Jan. 9, 1923.                    J. G. PYLE.                    1,441,750.
                                SCORE SHEET.
                              FILED JAN. 5, 1922.

| NO | | BID | PTS | G.N. | G.E. | HON. | G.N. | GE |
|----|---|-----|-----|------|------|------|------|----|
| 1  | N | O  11 | 22 | -12 |      | 26 19 |      |    |
|    |   | R  14 | 23 |     | 15   | 27 18 |      |    |
|    | E | O  14 | 24 9 |   | 16   | 28   |      |    |
|    |   | R  10 | 25 |     | 19   | 29   | 20   | 21 |
| 2  | N | O  |    | -12 |      |      |      | 6  |
|    |   | R  14 |   |     |      |      |      |    |
|    | E | O  14 | 9 |    |      |      |      |    |
|    |   | R  |    |     |      |      |      |    |
| 3  | N | O  14 |   | 12  |      |      |      | 6  |
|    |   | R  |    |     |      |      |      |    |
|    | E | O  14 | 9 |    |      |      |      |    |
|    |   | R  |    |     |      |      |      |    |
| 4  | N | O  14 |   | 12  |      |      |      | 6  |
|    |   | R  |    |     |      |      |      |    |
|    | E | O  14 | 9 |    |      |      |      |    |
|    |   | R  |    |     |      |      |      |    |
| TOTALS. | | | | | | | | |

Legend:
- No. — NUMBER OF BOARD PLAYED
- BID. — TRUMP MADE AND NUMBER OF TRICKS TO BE TAKEN. DOUBLE AND RE-DOUBLE.
- PTS. — POINTS MADE ON P.
- HON. — HONORS, PENALTIES AND BONUS MADE ON PLAY
- N. — NORTH ) POSITION OF PARTNERS
- E. — EAST ) AT TABLE
- O. — ORIGINAL PLAY OF HANDS
- R. — RE-PLAY OF HANDS
- G.N. — GAIN PARTNERS NORTH AND SOUTH
- G.E. — GAIN PARTNERS EAST AND WEST Inventor
J. G. PYLE Attorney Patented Jan. 9, 1923.

1,441,750

UNITED STATES PATENT OFFICE.

JOSEPH G. PYLE, OF SANDUSKY, OHIO.

SCORE SHEET.

Application filed January 5, 1922. Serial No. 527,146.

*To all whom it may concern:*

Be it known that I, JOSEPH G. PYLE, a citizen of the United States, residing at Sandusky, in the county of Erie and State of Ohio, have invented certain new and useful Improvements in Score Sheets, of which the following is a specification.

This invention relates to score sheets, and more particularly to score sheets for duplicate auction bridge.

An object of the invention is the provision of a score sheet in which the various figures to be added or subtracted are arranged in vertical columns, eliminating the necessity of adding and subtracting horizontally across the page.

A further object is the provision of a score sheet in which the original hand and replay hand are consolidated in a small square where they can be more readily viewed.

A further object is the provision of a score sheet of simple construction in which the number of columns to be added and subtracted to obtain the final total score is greatly diminished.

In the accompanying drawing, I have shown a front view of the score sheet forming the subject matter of the present invention.

Referring to the drawing, the reference numeral 1 designates the upper portion of a card which is provided with a vertical column 2 of abbreviations and explanations 3 appearing in alinement with the abbreviations.

The score sheet proper is divided into columns by vertical lines 4. The column 5 appearing at the extreme left of the sheet is provided with the indicia "No." at the top to indicate the number of the individual boards and hands. As shown, the numbers 1, 2, 3, and 4 appear opposite blocks formed by horizontal lines 6. A column 7 appears to the right of the column 5 and this column is provided with suitable indicia 8 to indicate the players. The spaces indicating the players are separated by horizontal lines 9. A column 10 is provided to the right of the column 7 and this column is provided with suitable indicia to indicate an original hand or a replay hand. Columns 11 and 12 are arranged to the right of column 9 and these columns are provided with suitable headings 13 to indicate the bid, and the points made on play. Horizontal lines 14 are provided to divide these columns into spaces for scoring the original hand and replay hand. To the right of column 12, there is provided columns 15 and 16 to indicate the gain of the North and South players and East and West players. A column 17 is provided for recording the honors and this column is provided with dividing lines 18 to score the honors of the North and South team and the East and West team and is further provided with horizontal lines 19 to score the honors of the original hand and the replay hand. Columns 20 and 21 are provided for recording the gain of each team in honors.

In scoring a game, the points made by each team on the original and replay hands are entered in the spaces 22, 23, 24, and 25. To obtain the score of the game, the sums in the spaces 22 and 23 are added and the sums in the spaces 24 and 25 are added. The smaller result is then subtracted from the larger result and entered in the appropriate column 15 or 16. The honors are entered in spaces 26, 27, 28 and 29, and the total appearing in the spaces 26 and 27 is obtained; likewise the total in the spaces 28 and 29. The smaller sum is then subtracted from the larger sum and the result entered in the appropriate column 20 or 21.

Heretofore, in score sheets for duplicate auction bridge, it has been necessary to add a plurality of sums horizontally of the sheet, skipping certain columns in each addition, and then subtract the smaller sum from the larger sum to obtain the final result.

By means of the present score sheet, the plays of the game may be readily understood and the results may be obtained by addition of figures appearing in vertical columns.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A score sheet for duplicate auction bridge having a plurality of intersecting vertical and horizontal lines dividing it into columns, and spaces in said columns, said columns being provided with headings, said sheet being provided with indications at one side in alinement with said spaces to designate sections of the card to be used for recording the score of each team, and being further provided with indications in one of said columns to designate horizontal spaces to be used for scoring original and replay hands.

2. A score sheet for duplicate auction bridge having a plurality of intersecting horizontal and vertical lines dividing it into columns and spaces, said columns being provided with suitable headings to indicate bids, points and honors, and headings arranged in one of said columns to divide the card horizontally into spaces for scoring original and replay hands, the spaces for the scores of the original and replay hands of each team being arranged adjacent to each other.

In testimony whereof I affix my signature in presence of two witnesses.

JOSEPH G. PYLE.

Witnesses:
 JAS. W. WYMER, Jr.,
 CAROLYN R. SPAHN.